(12) United States Patent
Inoshita et al.

(10) Patent No.: US 11,512,658 B2
(45) Date of Patent: Nov. 29, 2022

(54) ENGINE DEVICE

(71) Applicant: TOYOTA JIDOSHA KABUSHIKI KAISHA, Toyota (JP)

(72) Inventors: Kenji Inoshita, Okazaki (JP); Masanao Idogawa, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/539,645

(22) Filed: Dec. 1, 2021

(65) Prior Publication Data

US 2022/0178321 A1 Jun. 9, 2022

(30) Foreign Application Priority Data

Dec. 3, 2020 (JP) .............................. JP2020-201290

(51) Int. Cl.
*F02D 41/06* (2006.01)
*F02D 41/14* (2006.01)

(52) U.S. Cl.
CPC ....... *F02D 41/065* (2013.01); *F02D 41/1454* (2013.01)

(58) Field of Classification Search
CPC .................................................. F02D 41/126
See application file for complete search history.

(56) References Cited

U.S. PATENT DOCUMENTS

| 7,007,461 | B2* | 3/2006 | Lewis | F02D 37/02 |
| | | | | 123/481 |
| 2016/0222898 | A1* | 8/2016 | Ulrey | F02D 41/12 |
| 2016/0237926 | A1* | 8/2016 | Tanaka | F02D 41/0235 |
| 2019/0178181 | A1* | 6/2019 | Lupescu | F01N 3/18 |
| 2020/0200109 | A1* | 6/2020 | Phillips | F02D 41/1441 |

FOREIGN PATENT DOCUMENTS

JP 2017-194027 A 10/2017

* cited by examiner

*Primary Examiner* — Sizo B Vilakazi
*Assistant Examiner* — Anthony L Bacon
(74) *Attorney, Agent, or Firm* — Oliff PLC

(57) ABSTRACT

An engine device includes: an engine; and a control device that executes a return rich control that controls the engine so that an air-fuel ratio becomes rich over a predetermined period after the engine returns from the fuel cut. When the engine is intermittently stopped during the execution of the return rich control, the return rich control is executed for a period shorter than the predetermined period after the engine is restarted. Thus, when the engine is intermittently stopped during the execution of the return rich control and the engine is restarted thereafter, it is possible to suppress a total period of the return rich control from becoming long. As a result, it is possible to suppress an increase in the amount of hydrocarbons in the exhaust gas and suppress deterioration of emissions.

5 Claims, 3 Drawing Sheets

ENGINE DEVICE

CROSS-REFERENCE TO RELATED APPLICATION

This application claims priority to Japanese Patent Application No. 2020-201290 filed on Dec. 3, 2020, incorporated herein by reference in its entirety.

BACKGROUND

1. Technical Field

The present disclosure relates to an engine device.

2. Description of Related Art

An engine device is conventionally proposed as this type of engine device (see, for example, Japanese Unexamined Patent Application Publication No. 2017-194027 (JP 2017-194027 A)). In the engine device, a flag is turned on when cutting the fuel of an engine, and thereafter, when returning the engine from the fuel cut, a return rich control is executed to control the engine throughout a predetermined period on the condition that the flag is on so that an air-fuel ratio is rich.

SUMMARY

In the above-mentioned vehicle, when the engine is intermittently stopped during the execution of the return rich control and then the engine is restarted, the return rich control is executed for a predetermined period after the restart. Therefore, the total period of the return rich control becomes long, the amount of hydrocarbons in the exhaust gas becomes large, and the emission may be deteriorated.

The main purpose of the engine device of the present disclosure is to suppress deterioration of emissions.

The engine device according to the present disclosure has adopted the following means in order to achieve the main object above.

The engine device of the present disclosure is an engine device that includes: an engine; and a control device that executes a return rich control that controls the engine over a predetermined period after the engine returns from the fuel cut so that an air-fuel ratio becomes rich, in which when the engine is intermittently stopped during the execution of the return rich control, the control device executes the return rich control for a period shorter than the predetermined period after the engine is restarted.

In the engine device of the present disclosure, a return rich control that controls the engine over a predetermined period after the engine returns from the fuel cut so that an air-fuel ratio becomes rich is executed. When the engine is intermittently stopped during the execution of the return rich control, the return rich control is executed for a period shorter than the predetermined period after the engine is restarted. Thus, when the engine is intermittently stopped during the execution of the return rich control and the engine is restarted thereafter, it is possible to suppress a total period of the return rich control from becoming long. As a result, it is possible to suppress an increase in the amount of hydrocarbons in the exhaust gas and suppress deterioration of emissions.

In the engine device of the present disclosure, the control device may execute the return rich control for a second period that is shorter than the predetermined period only for a first period in which the return rich control is executed before the engine is intermittently stopped, after the engine is restarted. Thus, when the engine is intermittently stopped during the execution of the return rich control and the engine is restarted thereafter, it is possible to further appropriately suppress a total period of the return rich control from becoming long.

In this case, the control device may execute the return rich control after return from a fuel cut of the engine until a value of a first counter that is counted up every time fuel injection is performed in any cylinder in the return rich control after the fuel cut reaches or exceeds a threshold value corresponding to the predetermined period, and the control device may also hold the value of the first counter corresponding to the first period when the engine is intermittently stopped while the return rich control is being executed, and restart counting up of the first counter when the engine is restarted. Thus, by using the first counter, when the engine is intermittently stopped during the execution of the return rich control and the engine is restarted thereafter, it is possible to suppress a total period of the return rich control from becoming long.

In this case, the control device may hold the value of the first counter with a decrease of a value of a second counter serving as a trigger, and the second counter is counted up every time fuel is injected in any cylinder after returning from the fuel cut and the second counter is reset when the engine is intermittently stopped.

In the engine device of the present disclosure, the control device may control the engine by setting a target equivalent ratio within a range larger than a value 1 based on at least one of an air-fuel ratio in exhaust gas and an integrated value of an intake air amount during the fuel cut, in the return rich control after the engine is restarted. In this way, the return rich control after restarting the engine can be more appropriately executed based on the air-fuel ratio in the exhaust gas and the integrated value of the intake air amount during the fuel cut.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Next, modes for carrying out the present disclosure will be described using an embodiment.

Figure 1:
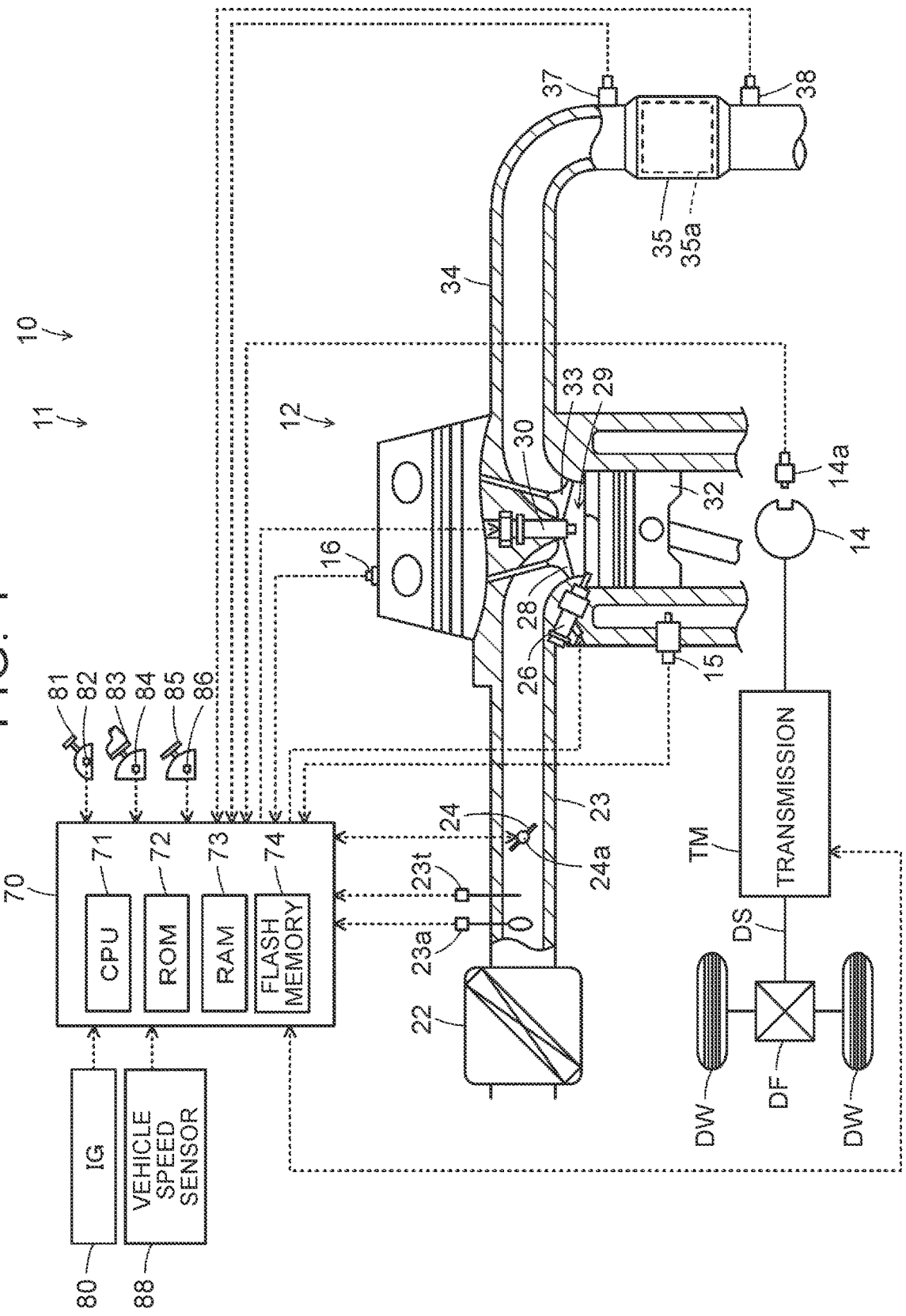
FIG. 1 is a configuration diagram showing an outline of a configuration of an automobile 10 including an engine device serving as an embodiment of the present disclosure.

FIG. 1 is a configuration diagram showing an outline of the configuration of an automobile 10 including an engine device 11 as an embodiment of the present disclosure. As shown in the figure, the automobile 10 of the embodiment includes a engine 12, a starter (not shown) for cranking the engine 12, a transmission TM that shifts power from the engine 12 and transmits the power to a drive shaft DS coupled to drive wheels DW via a differential gear DF, and an electronic control unit 70 serving as a control device that controls the engine 12, the starter, and the transmission TM. The engine device 11 of the embodiment mainly corresponds to the engine 12 and the electronic control unit 70.

The engine 12 is configured as a 4-cylinder internal combustion engine that outputs power through four strokes of intake, compression, expansion (explosion combustion), and exhaust gas using gasoline or diesel oil as fuel. The engine 12 has an in-cylinder injection valve 26 for injecting fuel into a cylinder, and a spark plug 30. The engine 12 intakes the air cleaned by the air cleaner 22 into an intake pipe 23, passes it through a throttle valve 24, and further intakes it into a combustion chamber 29 via an intake valve 28. Further, in the intake stroke and the compression stroke, fuel is injected from the in-cylinder injection valve 26 and explosively combusted by an electric spark from the spark plug 30. Then, a reciprocating motion of a piston 32 that is pushed down into a rotational motion of a crankshaft 14 by an energy generated through the explosive combustion above. The exhaust gas discharged from the combustion chamber 29 to an exhaust pipe 34 via an exhaust valve 33 is discharged to the outside air through a purification device 35. The purification device 35 has a purification catalyst (three-way catalyst) 35a that purifies harmful components of carbon monoxide (CO), hydrocarbon (HC), and nitrogen oxides (NOx).

The electronic control unit 70 has a microcomputer including a CPU 71, a ROM 72, a RAM 73, a flash memory 74, and an input/output port. Signals from various sensors are input to the electronic control unit 70 via the input port. The signals input to the electronic control unit 70 include, for example, a crank angle $\theta cr$ from a crank position sensor 14a that detects a rotational position of the crankshaft 14 of the engine 12, and a coolant temperature Tw from a coolant temperature sensor 15 that detects a temperature of a coolant of the engine 12. The examples of the signals also include a cam angles $\theta ci$, $\theta co$ from a cam position sensor 16 that detects a rotational position of an intake camshaft that opens and closes the intake valve 28 and a rotational position of an exhaust cam shaft that opens and closes the exhaust valve 33. The examples of the signals also include a throttle opening degree TH from a throttle position sensor 24a that detects a position (opening degree) of the throttle valve 24, an intake air amount Qa from an air flow meter 23a installed on the upstream side of the intake pipe 23 with respect to the throttle valve 24, and an intake air temperature Ta from a temperature sensor 23t attached to an upstream side of the intake pipe 23 with respect to the throttle valve 24. The examples of the signals also include a front air-fuel ratio AF1 from a front air-fuel ratio sensor 37 installed on the upstream side of the exhaust pipe 34 with respect to the purification device 35, and a rear air-fuel ratio AF2 from a rear air-fuel ratio sensor 38 installed on the downstream side of the exhaust pipe 34 with respect to the purification device 35. The examples of the signals also includes a rotation speed of the input shaft of the transmission TM from the rotation speed sensor attached to the input shaft of the transmission TM, and a rotation speed of the output shaft of the transmission TM from the rotation speed sensor attached to the output shaft of the transmission TM. The examples of the signals also include an ignition signal IG from an ignition switch 80, and a shift position SP from a shift position sensor 82 that detects an operating position of a shift lever 81. The examples of the signals also include an accelerator operation amount Acc from an accelerator pedal position sensor 84 that detects an amount of depression of an accelerator pedal 83, a brake pedal position BP from a brake pedal position sensor 86 that detects an amount of depression of a brake pedal 85, and a vehicle speed V from a vehicle speed sensor 88.

Various types of control signals are output from the electronic control unit 70 via the output port. Examples of the signals output from the electronic control unit 70 include a control signal to the throttle valve 24 of the engine 12, a control signal to the in-cylinder injection valve 26, and a control signal to the spark plug 30. The examples of the signals also include a control signal to the transmission TM and a control signal to the starter (not shown).

The electronic control unit 70 calculates a rotation speed Ne of the engine 12 based on a crank angle $\theta cr$ from the crank position sensor 14a. Further, the electronic control unit 70 calculates a load factor (the ratio of the volume of air actually taken in one cycle with respect to a stroke volume per one cycle of the engine 12) KL based on the intake air amount Qa from the air flow meter 23a and the rotation speed Ne of the engine 12. Further, the electronic control unit 70 estimates the temperature Tc of the purification catalyst 35a of the purification device 35 based on the coolant temperature Tw from the coolant temperature sensor 15, the rotation speed Ne of the engine 12, and the load factor KL. In addition, the electronic control unit 70 estimates an oxygen storage amount OS of the purification catalyst 35a of the purification device 35 based on the front air-fuel ratio AF1 from the front air-fuel ratio sensor 37 and/or the rear air-fuel ratio AF2 from the rear air-fuel ratio sensor 38 and the intake air amount Qa.

In the automobile 10 of the embodiment constituted in this way, the electronic control unit 70 sets a target shift speed Gs* of the transmission TM based on the accelerator operation amount Acc and the vehicle speed V, and control the transmission TM so that the shift speed Gs of the transmission TM becomes the target shift speed Gs*. Further, the electronic control unit 70 sets a target torque Te* of the engine 12 based on the accelerator operation amount Acc, the vehicle speed V, and the shift speed Gs of the transmission TM, and performs the intake air amount control, the fuel injection control, and the ignition control of the engine 12 so that the engine 12 is operated based on the target torque Te*.

In the intake air amount control, the electronic control unit 70 sets a target throttle opening degree TH* of the throttle valve 24 based on the target torque Te* of the engine 12, and controls the throttle valve 24 so that the throttle opening degree TH becomes the target throttle opening degree TH*. In fuel injection control, the electronic control unit 70 sets a target fuel injection amount Qfd* of the in-cylinder injection valve 26 so that an equivalent ratio $\varphi$ obtained by dividing a stoichiometric air-fuel ratio by the front air-fuel ratio AF1 becomes a target equivalent ratio $\varphi$* based on the load factor KL of the engine 12, and controls the in-cylinder injection valve 26 so that the fuel of the target fuel injection amount Qfd* is injected from the in-cylinder injection valve 26. For the target equivalent ratio $\varphi$*, basically, a value larger than the value 1 (value on the rich side) and a value smaller than the value 1 (value on the lean side) are alternately set based on the rear air-fuel ratio AF2. Hereinafter, this is referred to as a "sub-feedback control". In ignition control, the electronic control unit 70 sets a target ignition timing Tf* of the spark plug 30 based on the rotation speed Ne of the engine 12 and the load factor KL, and controls the spark plug 30 so that ignition is performed at the target ignition timing Tf*.

Further, in the automobile 10 of the embodiment, during traveling, when the accelerator is released while the engine 12 is in operation, the electronic control unit 70 executes the fuel cut of the engine 12 (interrupts the fuel injection control and the ignition control), and when the accelerator is turned on during the fuel cut of the engine 12, the electronic control unit 70 causes the engine 12 to return from the fuel cut (restarts the fuel injection control and the ignition control).

Further, in the automobile 10 of the embodiment, while the vehicle is stopped, when an intermittent stop condition is satisfied during the operation of the engine 12, the electronic control unit 70 intermittently stops the engine 12, and when a restart condition is satisfied while the engine 12 is intermittently stopped, the electronic control unit 70 causes the engine 12 to be cranked by the starter and causes the engine 12 to be restarted. As the intermittent stop condition, for example, a condition in which the accelerator is off and the brake is on is used. As the restart condition, for example, a condition in which the accelerator is on or the brake is off is used.

Figure 2:
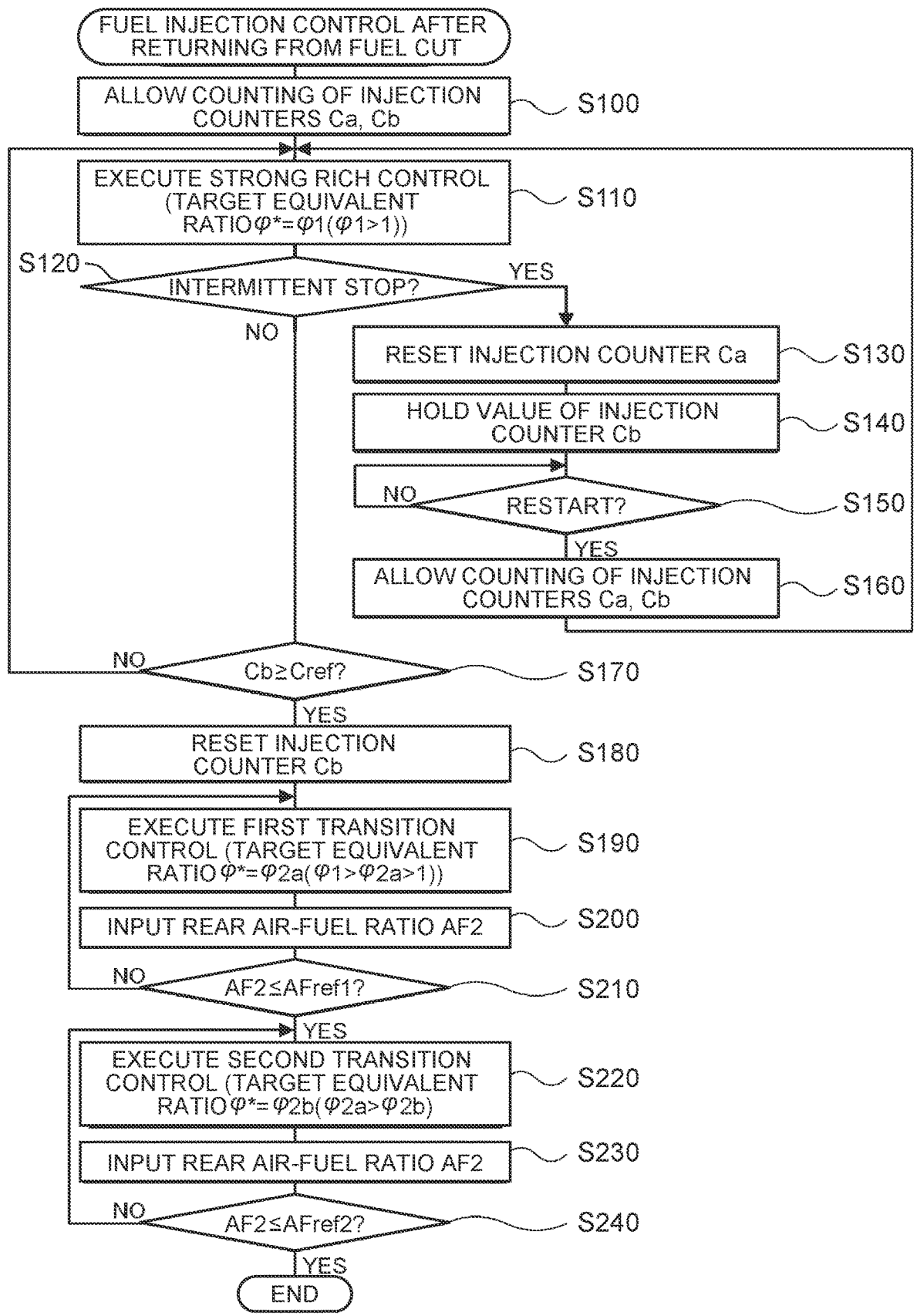
FIG. 2 is a flowchart showing an example of a fuel injection control executed by an electronic control unit 70 after returning from a fuel cut.

Next, the operation of the automobile 10 of the embodiment configured in this way, particularly the fuel injection control of the engine 12 after the return from the fuel cut will be described. FIG. 2 is a flowchart showing an example of the fuel injection control executed by the electronic control unit 70 after returning from a fuel cut. This control is executed when returning from the fuel cut. When this control is being executed, the above-mentioned sub-feedback control is stopped.

When the fuel injection control after the return from the fuel cut in FIG. 2 is executed, the electronic control unit 70 first allows an injection counter Ca (second counter) and an injection counter Cb (first counter) to be counted (step S100), and sets a target equivalent ratio $\varphi^*$ to a value $\varphi 1$ that is larger than a value 1 to a certain degree and executes a strong rich control (return rich control) for performing the fuel injection control (step S110). Here, the injection counter Ca is a counter that counts up every time fuel is injected from the in-cylinder injection valve 26 in any cylinder after returning from the fuel cut. The injection counter Ca is reset to a value of 0 as an initial value when the vehicle starts the system, when the fuel is cut, or when the engine 12 is intermittently stopped. The injection counter Cb is a counter that counts up each time fuel is injected from the in-cylinder injection valve 26 in any cylinder under strong rich control after returning from the fuel cut. The injection counter Cb is reset to a value of 0 as an initial value when the vehicle starts the system or when the strong rich control is finished. The strong rich control is executed to stabilize the combustion of the engine 12.

Subsequently, it is determined whether the engine 12 is intermittently stopped during the execution of the strong rich control (step S120). The case in which the engine 12 is not intermittently stopped (operation is continued) will be considered. In this case, it is determined whether the value of the injection counter Cb is equal to or greater than a threshold value Cref (step S170). Here, the threshold value Cref is a threshold value used for determining whether to end the strong rich control, and when the engine 12 has four cylinders, for example, a value 4 or a value 8 is used. When it is determined in step S170 that the value of the injection counter Ca is less than the threshold value Cref, it is determined that the strong rich control is not finished (is continued), and the process returns to step S110. Since the case in which the engine 12 is not intermittently stopped is considered, the process of steps S110, S120, and S170 is a process of waiting for the value of the injection counter Cb to reach the threshold value Cref or more while executing the strong rich control.

When it is determined in step S170 that the value of the injection counter Cb is equal to or greater than the threshold value Cref, it is determined that the strong rich control is finished, the injection counter Cb is reset to the value 0 (step S180), and a first transition control in which the fuel injection control in which a value $\varphi 2a$ that is smaller than the value $\varphi 1$ described above and that is larger than the value 1 is set as the target equivalent ratio $\varphi^*$ is performed is executed (step S190). The first transition control and a second transition control described later is executed in order to smooth the change of equivalent ratio $\varphi$ (air-fuel ratio) the equivalent ratio $\varphi$ (empty) of the engine 12 when the fuel injection control is transitioned from the strong rich control to the normal control (the fuel injection control using the above-mentioned sub-feedback control) to some extent.

Subsequently, the rear air-fuel ratio AF2 from the rear air-fuel ratio sensor 38 is input (step S200), and it is determined whether the input rear air-fuel ratio AF2 has reached a threshold value AFref1 or less (step S210). Here, the threshold value AFref1 is a threshold value used for determining whether to end the first transition control, and for example, a theoretical air-fuel ratio or a value (value on the lean side) slightly larger than the stoichiometric air-fuel ratio is used. When it is determined in step S210 that the rear air-fuel ratio AF2 is larger than the threshold value AFref1, it is determined that the first transition control is not finished (is continued), and the process returns to step S190. The processes of steps S190 to S210 are processes of waiting for the rear air-fuel ratio AF2 to reach the threshold value AFref1 or less while executing the first transition control.

When it is determined in step S210 that the rear air-fuel ratio AF2 has reached the threshold value AFref1 or less, it is determined that the first transition control is finished, and the second transition control in which the value $\varphi 2b$ that is smaller than the above-mentioned value $\varphi 2a$ is set as the target equivalent ratio $\varphi^*$ and the fuel injection control is performed is executed (step S220). Here, as the value $\varphi 2b$, for example, a value 1 or the like is used.

Subsequently, the rear air-fuel ratio AF2 from the rear air-fuel ratio sensor 38 is input (step S230), and it is determined whether the input rear air-fuel ratio AF2 reaches the threshold value AFref2 or less, in which the threshold value AFref2 is smaller than the threshold value AFref1 (step S240). Here, the threshold value AFref2 is a threshold value used for determining whether to finish the second transition control, and a value that is smaller than the threshold value AFref1 by a predetermined value or by a predetermined ratio is used. When it is determined in step S240 that the rear air-fuel ratio AF2 is larger than the threshold value AFref2, it is determined that the second transition control is not finished, and the process returns to step S220. The processes of steps S220 to S240 are processes of waiting for the rear air-fuel ratio AF2 to reach the threshold value AFref2 or less while executing the second transition control. When it is determined in step S240 that the rear air-fuel ratio AF2 has reached the threshold value AFref2 or less, the present control is finished. When this control is finished in this way, the normal control (the fuel injection control using the sub-feedback control) is started as the fuel injection control.

When it is determined in step S120 that the engine 12 is intermittently stopped, that is, when the engine 12 is intermittently stopped during execution of the strong rich control, the injection counter Ca is reset to a value 0 (step S130), the value of the injection counter Cb is held with the decrease of the injection counter Ca serving as the trigger (step S140), and the process waits for the engine 12 to be restarted (step S150). Then, when the engine 12 is restarted, the counting of the injection counter Ca and the injection counter Cb are re-permitted (step S160), and the process returns to step S110.

In the embodiment, when the engine 12 is intermittently stopped during the execution of the strong rich control, the value of the injection counter Cb is held, and the count-up of the injection counter Cb is restarted when the engine 12 is restarted. Thus, after the engine 12 is restarted, the strong rich control is performed for a period (second period) that is shorter than a period (predetermined period) corresponding to the threshold value Cref for just the period corresponding to the value of the injection counter Cb when the engine 12 is intermittently stopped (the first period in which the strong rich control is executed before the intermittent stop of the engine 12). As a result, compared to a process in which the injection counter Cb is reset to a value 0 when the engine 12 is intermittently stopped, that is, a process in which the strong rich control is executed through the period (predetermined period) corresponding to the threshold value Cref after the engine 12 is restarted, it is possible to suppress the period of the strong rich control after the engine 12 is restarted as well as the total period of the strong rich control after the return from the fuel cut of the engine 12 from becoming long. As a result, it is possible to suppress an increase in the amount of hydrocarbons in the exhaust gas from the combustion chamber 29 and suppress deterioration of emissions.

Figure 3:
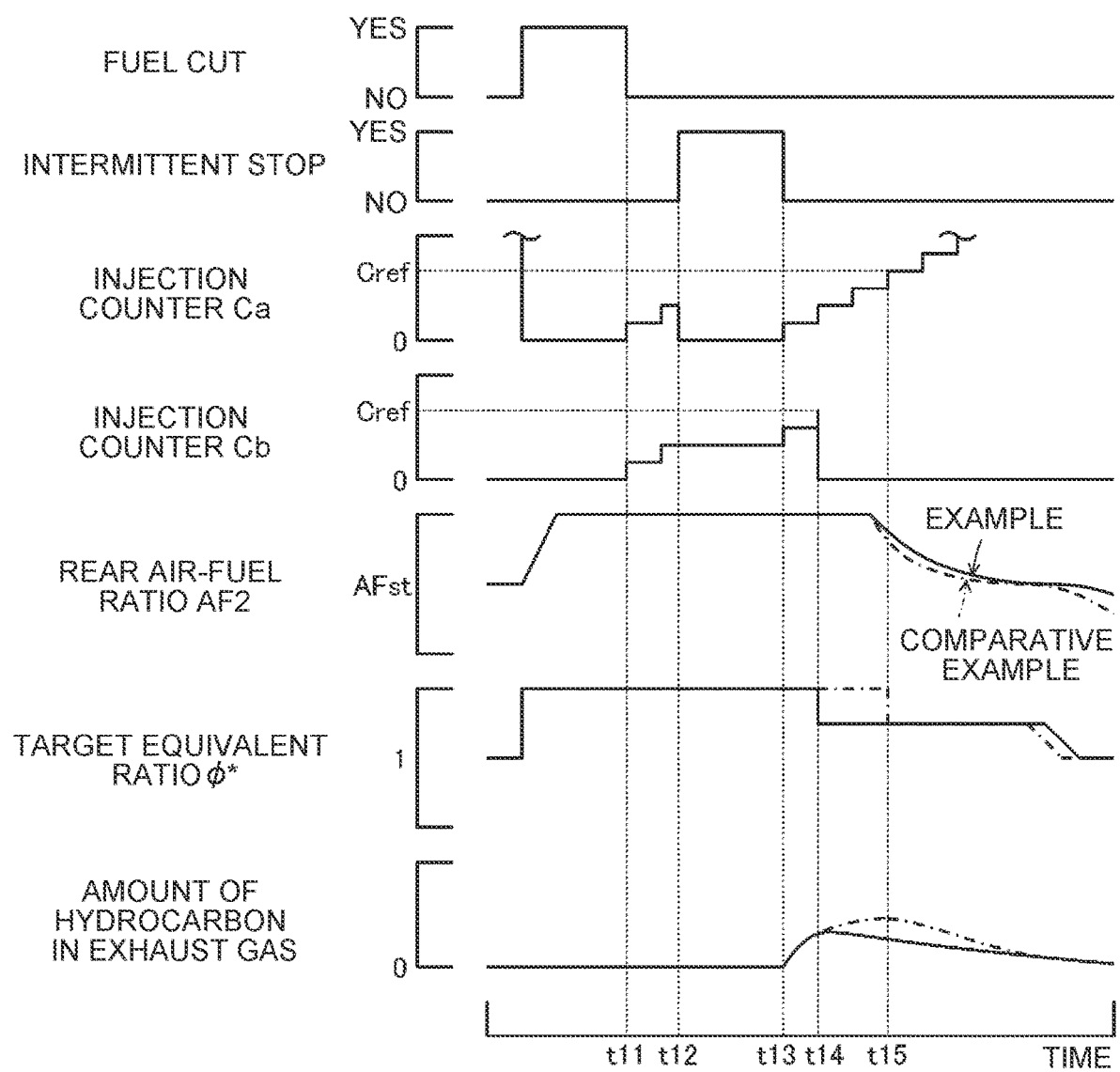
FIG. 3 is a timing chart that shows whether a fuel cut is executed, whether an intermittent stop is executed, and an example of a state of an amount of an injection counter Ca, an injection counter Cb, an rear air-fuel ratio AF2, a target equivalent ratio $\varphi^*$, and hydrocarbons (HC) in exhaust gas from the combustion chamber 29.

FIG. 3 is a timing chart that shows whether the fuel cut is executed, whether the intermittent stop is executed, and an example of a state of an amount of the injection counter Ca, the injection counter Cb, the rear air-fuel ratio AF2, the target equivalent ratio $\varphi^*$, and the hydrocarbons (HC) in the exhaust gas from the combustion chamber 29. In FIG. 3, regarding the rear air-fuel ratio AF2, the target equivalent ratio $\varphi^*$, and the amount of hydrocarbons in the exhaust gas from the combustion chamber 29, a solid line shows a state of the embodiment, and a long dashed short dashed line shows a state of a comparative example. In the comparative example, the strong rich control is finished when the value of the injection counter Ca reaches the threshold value Cref or more during the execution of the strong rich control. This is the same as the case in which the injection counter Cb is reset to the value 0 when the engine 12 is intermittently stopped, in the case in which the strong rich control is finished when the value of the injection counter Cb reaches the threshold value Cref or more during the execution of the strong rich control, similar to the embodiment. As shown in the figure, in the example and the comparative example, when the engine 12 returns from the fuel cut (time t11), the injection counter Ca and the injection counter Cb are allowed to be counted and the strong rich control is executed, and the injection counter Ca and the injection counter Cb are counted. Then, when the engine 12 is intermittently stopped during the execution of the strong rich control (time t12), the injection counter Ca is reset, and the value of the injection counter Cb is held with the decrease in the value of the injection counter Ca serving as a trigger. Thereafter, when the engine 12 is restarted (time t13), the counting of the injection counter Ca and the injection counter Cb are re-permitted and the strong rich control is restarted. In the comparative example, the strong rich control is finished when the value of the injection counter Ca reaches the threshold value Cref or more (time t15). In the embodiment, the strong rich control is finished when the value of the injection counter Cb reaches the threshold value Cref or more (time t14). As a result, in the embodiment, compared to the comparative example, the period of the strong rich control after the engine 12 is restarted and also the total period of the strong rich control after the return from the fuel cut of the engine 12 can be suppressed from becoming long. As a result, it is possible to suppress an increase in the amount of hydrocarbons in the exhaust gas from the combustion chamber 29 and suppress deterioration of emissions.

In the engine device 11 included in the automobile 10 of the above-described embodiment, after the engine 12 returns from the fuel cut, the strong rich control is executed until the injection counter Cb reaches the threshold value Cref or more. When the engine 12 is intermittently stopped during the execution of the strong rich control, the value of the injection counter Cb is held, and the count-up of the injection counter Cb is restarted when the engine 12 is restarted. As a result, the period of the strong rich control after the engine 12 is restarted and also the total period of the strong rich control after the return from the fuel cut of the engine 12 can be suppressed from becoming long. As a result, it is possible to suppress an increase in the amount of hydrocarbons in the exhaust gas from the combustion chamber 29 and suppress deterioration of emissions.

In the engine device 11 included in the automobile 10 of the embodiment, the injection counter Ca and the injection counter Cb are used to reset the injection counter Ca when the engine 12 is intermittently stopped during the execution of the strong rich control, and the value of the injection counter Cb is held with the decrease in the value of the injection counter Ca serving as the trigger. However, the value of the injection counter Cb may be held when the engine 12 is intermittently stopped during the execution of the strong rich control without using the injection counter Ca. In the first place, the injection counter Cb is a counter that counts up each time fuel is injected from the in-cylinder injection valve 26 in any cylinder under strong rich control after returning from the fuel cut. Thus, when the engine 12 is intermittently stopped during the execution of the strong rich control, the value at that time is held if the value is not reset.

In the engine device 11 of the automobile 10 of the embodiment, when the engine 12 is intermittently stopped during the execution of the strong rich control, the value of the injection counter Cb is held, and the count-up of the injection counter Cb is restarted when the engine 12 is restarted. That is, after the engine 12 is restarted, the strong rich control is performed for a period (second period) that is shorter than a period (predetermined period) corresponding to the threshold value Cref for just the period corresponding to the value of the injection counter Cb when the engine 12 is intermittently stopped (the first period in which the strong rich control is executed before the intermittent stop of the engine 12). However, an applicable embodiment of the present disclosure is not limited to this, as long as the strong rich control is executed for a period shorter than the period (predetermined period) corresponding to the threshold value Cref after the engine 12 is restarted. For example, when the threshold value Cref is a value 8 and the injection counter Cb is a value 6 when the engine 12 is intermittently stopped, in the embodiment, the count-up of the injection counter Cb is restarted from the value 6 when the engine 12 is restarted. However, the count-up may be restarted from the value 5 or the value 4.

In the engine device 11 included in the automobile 10, after the engine 12 returns from the fuel cut, the strong rich control is executed until the injection counter Cb reaches the threshold value Cref or more. In such a case, when the engine 12 is intermittently stopped during the execution of the strong rich control, the value of the injection counter Cb is held, and the count-up of the injection counter Cb is restarted when the engine 12 is restarted. However, instead of the injection counter Cb, an integrated rotation amount Acr of the crankshaft 14 after the return from the fuel cut of the engine 12 may be used. In this case, after returning from the fuel cut of the engine 12, the strong rich control is executed until the integrated rotation amount Acr of the crankshaft 14 reaches a threshold value Acrref or more. In such a case, when the engine 12 is stopped while the strong rich control is being executed, the value of the integrated rotation amount Acr of the crankshaft 14 may be held, and when the engine 12 is restarted, the integration of the integrated rotation amount Acr of the crankshaft 14 may be restarted. As the threshold value Accref, for example, 720° CA, 1440° CA, or the like is used.

In the engine device 11 included in the automobile 10 of the embodiment, the value $\varphi 1^*$ is set to the target equivalent ratio $\varphi^*$ by the strong rich control. However, when the engine 12 is intermittently stopped during the execution of the strong rich control, in the strong rich control after the engine 12 is restarted, instead of setting the target equivalent ratio $\varphi^*$ to the value $\varphi 1$, the target equivalent ratio $\varphi^*$ may set based on at least one of the rear air-fuel ratio AF2 or the integrated value of the intake air amount Qa during the fuel cut before the strong rich control is started (hereinafter, the integrated value will be referred to as an "intake air amount Gafc during the fuel cut"). In this case, it is preferable to set the target equivalent ratio $\varphi^*$ so that the smaller the rear air-fuel ratio AF2, the smaller the target equivalent ratio $\varphi^*$, or set the target equivalent ratio $\varphi^*$ so that the smaller the integrated air amount Gafc during the fuel cut, the smaller the target equivalent ratio $\varphi^*$. This is to suppress the atmosphere of the purification catalyst 35a of the purification device 35 from becoming excessively rich by the strong rich control after the engine 12 is restarted.

In the engine device 11 included in the automobile 10 of the embodiment, after the end of the strong rich control, the two-step transition control (first transition control, second transition control) is executed, and then the normal control is executed. However, after the strong rich control is finished, a one-step transition control (for example, the first transition control or the second transition control) may be executed, and then the normal control may be executed. Further, after the strong rich control is finished, a transition control of three or more stages may be executed, and then the normal control may be executed. Further, after executing the strong rich control, the normal control may be executed without executing a transition control. In addition, when the front air-fuel ratio sensor 37 is inactive at the end of the strong rich control, the normal control may be executed after executing the transition control that has a larger number of steps than when the front air-fuel ratio sensor 37 is active at the end of the strong rich control. For example, when the front air-fuel ratio sensor 37 is inactive at the end of the strong rich control, before the first transition control, the third transition control that sets the target equivalent ratio $\varphi^*$ to a value $\varphi 2c$ smaller than the above-mentioned value $\varphi 1$ and larger than the value $\varphi 2a$ and that performs the fuel injection control may be executed. In this case, if the front air-fuel ratio sensor 37 becomes active during the execution of the third transition control, the third transition control may be finished.

In the engine device 11 provided in the automobile 10 according to the embodiment, the engine 12 includes the in-cylinder injection valve 26 that injects the fuel into the cylinder. However, in addition to or in place of the in-cylinder injection valve 26, the engine 12 may include a port injection valve that injects the fuel into the intake port.

In the engine device 11 included in the automobile 10 of the embodiment, the 4-cylinder engine 12 is used. However, an engine such as a 6-cylinder engine or an 8-cylinder engine may be used.

In the embodiment, the form is such that the engine device 11 is included in the automobile 10 that travels by using power from the engine 12. However, the engine 12 may be in the form of the engine device 11 included in a vehicle capable of intermittent operation, and may be in the form of the engine device 11 included in a hybrid vehicle including a motor in addition to the engine.

The correspondence relationship between the main elements of the embodiment and the main elements of the present disclosure described in the summary will be described. In the embodiment, the engine 12 corresponds to the "engine" and the electronic control unit 70 corresponds to the "control device".

The correspondence between the main elements of the embodiment and the main elements of the present disclosure described in the summary is an example for specifically describing a mode for carrying out the present disclosure described in the summary. Therefore, the embodiment does not limit the elements of the present disclosure described in the summary. That is, the interpretation of the present disclosure described in the summary should be carried out based on the description in the summary, and the embodiment is merely a specific example of the present disclosure described in the summary.

Although the mode for carrying out the present disclosure has been described above with reference to the embodiment, an applicable embodiment of the present disclosure is not limited to the embodiment, and the present disclosure may be carried out in various modes without departing from the gist of the present disclosure.

The present disclosure can be used in, for example, the manufacturing industry of the engine device.

What is claimed is:

1. An engine device comprising:
   an engine; and
   a control device that executes a return rich control that controls the engine over a predetermined period after the engine returns from a fuel cut so that an air-fuel ratio becomes rich,
   wherein when the engine is intermittently stopped while the return rich control is executed, the control device executes the return rich control for a period shorter than the predetermined period after the engine is restarted.

2. The engine device according to claim 1, wherein the control device executes the return rich control for a second period that is shorter than the predetermined period only for a first period in which the return rich control is executed before the engine is intermittently stopped, after the engine is restarted.

3. The engine device according to claim 2, wherein:
   the control device executes the return rich control after returning from the fuel cut of the engine until a value of a first counter that is counted up every time fuel injection is performed in any cylinder in the return rich control after returning from the fuel cut reaches or exceeds a threshold value corresponding to the predetermined period; and the control device also holds the value of the first counter corresponding to the first period when the engine is intermittently stopped while the return rich control is executed, and restarts counting up the first counter when the engine is restarted.

4. The engine device according to claim 3, wherein:

the control device holds the value of the first counter with a decrease of a value of a second counter serving as a trigger; and the second counter is counted up every time fuel is injected in any cylinder after returning from the fuel cut and the second counter is reset when the engine is intermittently stopped.

5. The engine device according to claim 1, wherein the control device controls the engine by setting a target equivalent ratio within a range larger than a value 1 based on at least one of an air-fuel ratio in exhaust gas and an integrated value of an intake air amount during the fuel cut, in the return rich control after the engine is restarted.

* * * * *